United States Patent [19]
De With et al.

[11] Patent Number: 5,245,428
[45] Date of Patent: Sep. 14, 1993

[54] TELEVISION SYSTEM FOR TRANSMITTING PICTURE SIGNALS IN A DIGITAL FORMAT

[75] Inventors: Peter H. N. De With; Petrus D. Verlinden; Stephanus J. J. Nijssen, all of Eindhoven, Netherlands

[73] Assignee: U.S. Philips Corporation, New York, N.Y.

[21] Appl. No.: 865,523

[22] Filed: Apr. 9, 1992

[30] Foreign Application Priority Data

May 10, 1991 [EP] European Pat. Off. ......... 91201131.9

[51] Int. Cl.⁵ .................. H04N 5/78; H04N 7/133
[52] U.S. Cl. .................. 358/133; 358/141; 358/142; 358/335
[58] Field of Search ............... 358/133, 141, 142, 335

[56] References Cited

U.S. PATENT DOCUMENTS 5,148,272 9/1992 Acampora .................. 358/133

Primary Examiner—Howard W. Britton
Attorney, Agent, or Firm—Edward W. Goodman

[57] ABSTRACT

To be able to transmit television pictures in a digital format on a medium having a limited bandwidth, the picture are subjected to a coding operation and thereby converted into a series of transmission bit blocks $TRB_n$ of variable length (for example DCT and variable length coding). Each transmission bit block is divided into a main block $H_n$ having at least the most important code words and an auxiliary block $S_n$ comprising the other code words. By carrying out a formatting operation, a group of transmission bit blocks is converted into a channel bit block consisting of a number of sub-channel bit blocks $SCB_n$ of equal length. The main blocks are accommodated at the first bit positions of the sub-channel bit blocks and the bits of the auxiliary blocks are spread over the remaining bit positions. It is thereby achieved that the most important information is always found at fixed locations so that the influence of sync losses is reduced considerably.

8 Claims, 11 Drawing Sheets $y_{00}\ y_{01}\ y_{10}\ y_{20}\ y_{11}\ y_{02}\ y_{03}\ y_{12}\ y_{21}\ y_{30}\ y_{40}\ \ldots\ y_{75}\ y_{66}\ y_{57}\ y_{67}\ y_{76}\ y_{77}$ $\hat{y}_{00}\ \hat{y}_{01}\ \hat{y}_{10}\ \hat{y}_{20}\ \hat{y}_{11}\ \hat{y}_{02}\ \hat{y}_{03}\ \hat{y}_{12}\ \hat{y}_{21}\ \hat{y}_{30}\ \hat{y}_{40}\ \ldots\ \hat{y}_{75}\ \hat{y}_{66}\ \hat{y}_{57}\ \hat{y}_{67}\ \hat{y}_{76}\ \hat{y}_{77}$

FIG.6A
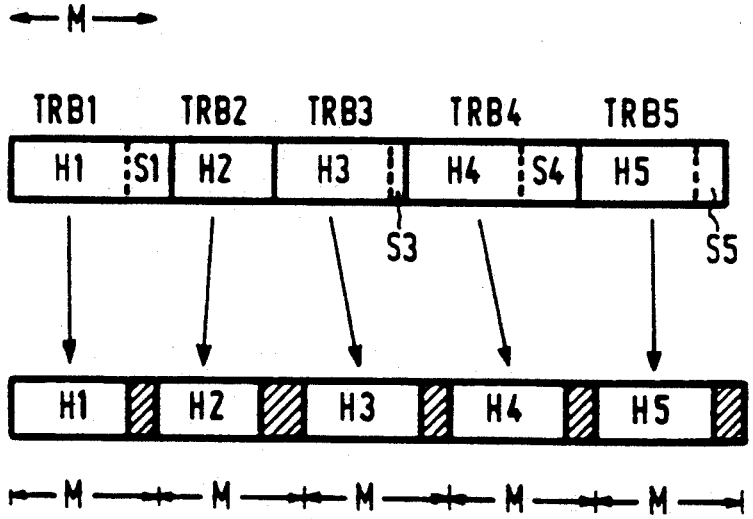
FIG.6B
FIG.6C
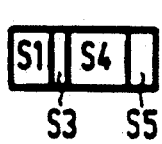
FIG.6D
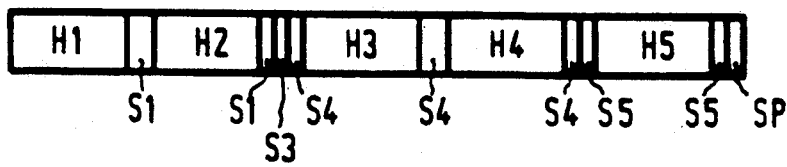
FIG.6E

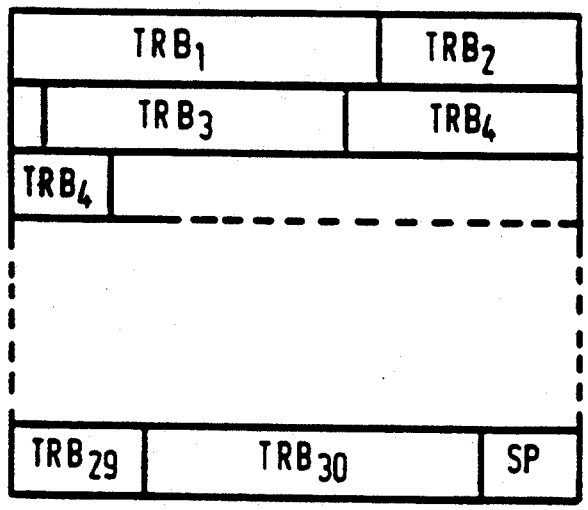
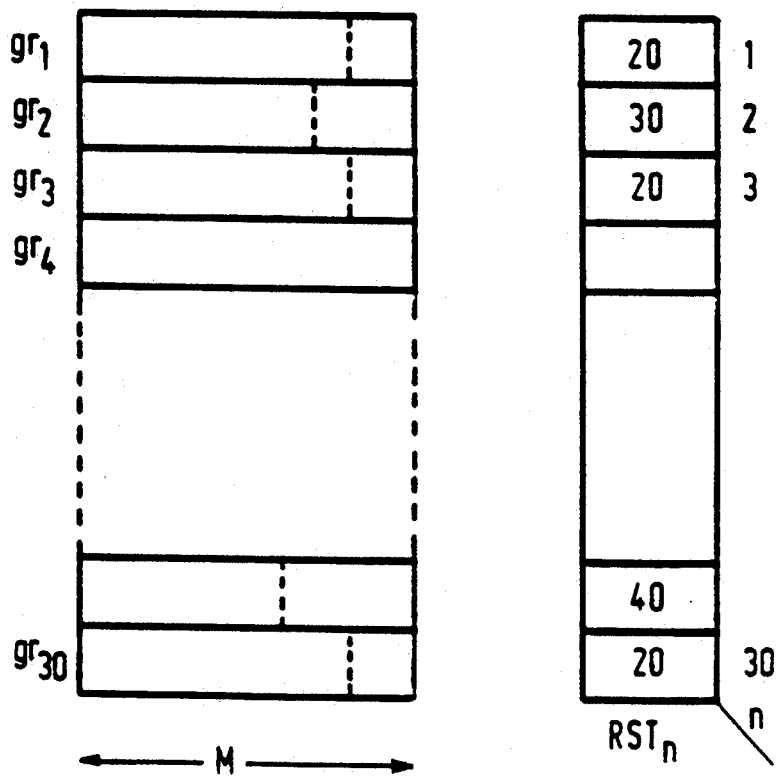
FIG.7A  FIG.7B  FIG.7C  FIG.7D

TELEVISION SYSTEM FOR TRANSMITTING PICTURE SIGNALS IN A DIGITAL FORMAT

BACKGROUND OF THE INVENTION (1) Field of the Invention

The invention generally relates to a television system for transmitting picture signals from a transmitter station to a receiver station through some transmission medium, in which system these picture signals are packed in a channel bit stream.

More particularly, the invention relates to a transmitter station and a receiver station for such a television system in which the original quantity of picture data is reduced in the transmitter station by means of a coding operation and the original information is regained in the receiver station by means of a decoding operation which is inverse to the coding operation.

Said transmission medium may be the atmosphere, but also a video tape or a video compact disc.

The invention also relates to a channel bit stream which represents in a digital form the picture signals to be transmitted, and to a storage medium on which said channel bit stream is stored and to a video recorder device adapted to generate and store said channel bit stream and/or display it.

(2) Description of the Prior Art

As is generally known, a television picture is completely defined by three picture signals PS(1), PS(2), PS(3). These may be the three primary color signals R, G, B or, which is the same, one luminance signal Y and two color difference signals CHR(1) and CHR(2) which are sometimes denoted U and V, sometimes by I and Q, respectively, while many other indications are in use too.

For transmitting a television picture in a digital format, the television picture is considered to be a two-dimensional matrix consisting of M rows with N pixels each and only the values of the three picture signals associated with these M×N pixels are transmitted to the receiver. These values of the picture signals will be further referred to as picture signal samples and more particularly the terms luminance samples Y and color difference samples CHR(1) and CHR(2) will hereinafter be used.

In a 625-line TV picture, the visible part of each picture comprises 576 lines with 720 pixels each. If each luminance sample of such a pixel is represented by, for example an eight-bit code word, approximately $3 \times 10^6$ bits are required for representing all luminance samples only, which means that there is a bit rate of approximately $75 \times 10^6$ bits/sec in the case of 25 frames per second. This is inadmissibly high in practice. The object envisaged by the researchers is to realise a bit rate of approximately 20 Mbit/sec for recording digitized video signals on a magnetic tape or another storage medium.

To achieve said object, the series of television pictures is subjected to some coding operation. Many widely different coding operations are possible and in use. All of them have the property that they make the information to be transmitted available in clusters of code words, these clusters comprising very important code words which may absolutely not be lost (further referred to as first code words) and less important code words (further referred to as second code words) whose loss is less dramatic. The number of code words per cluster may differ from cluster to cluster and the number of bits may differ from code word to code word. In other words, the clusters vary in length. For good order's sake, it is to be noted that the number of second code words in a cluster may be zero. A cluster of code words will hereinafter be referred to as transmission bit block.

An important class of coding operations is the transform coding (see for example Reference 1 in section C). A picture to be coded is partitioned into a plurality of sub-pictures of E by E pixels each. A usual value for E is eight so that a picture is partitioned into 6480 sub-pictures. Each sub-picture is subjected to a forward two-dimensional transform (for example, a discrete cosine transform) and converted into a coefficient block of 8 by 8 coefficients. The most important coefficient is a measure of the average luminance (or colour difference value) and is therefore referred to as dc coefficient. The other 63 coefficients which describe details of the sub-picture are referred to as ac coefficients and their importance generally decreases as the spatial frequency which they represent increases.

Such a coefficient block is further first subjected to some quantization operation and subsequently to some variable length coding. Each coefficient block is thus converted into a transmission bit block consisting of a series of serial data words.

In transform coding, the picture to be coded may be the television picture itself (this is referred to as intraframe transform coding) but also a difference picture, which is produced by subtracting two successive television pictures from each other or by subtracting a prediction picture from a received television picture which is derived from the transmitted difference pictures by means of a prediction circuit. Motion compensation may then be used (see Reference 7 in section C). This is referred to as interframe transform coding. The coding operation may also comprise a combination of intra and interframe transform coding, with a sub-picture being subjected to interframe transform coding if there is little motion in this sub-picture and to intraframe transform coding if there is much motion.

Another coding operation is known as "Adaptive Dynamic Range Coding" (see Reference 8 in section C). In this operation the smallest picture signal sample for each sub-picture as well as the differences between this smallest picture signal sample and the other picture signal samples after they have been subjected to some variable length coding are transmitted as one transmission bit block. The most important code word in this transmission bit block is the code word representing the smallest picture signal sample.

Without further going into detail, it is to be noted that yet another coding operation is known under the name of "Sub-band Coding".

To regain the original picture at the receiver station, the received transmission bit blocks are subjected to a decoding operation which comprises, inter alia a variable length decoding and with which a number of operations are performed on the received transmission bit block which are inverse to the operations performed at the transmitter station so that the original picture is obtained again.

Although a considerable bit rate reduction is realized by means of variable length coding as compared with fixed length coding, the series of data words thus obtained is however very sensitive to transmission errors. A transmission error generally involves loss of synchronization at the receiver station. This means that the separate data words are not recognized as such. The result is a seriously distorted video picture.

OBJECT AND SUMMARY OF THE INVENTION

It is an object of the invention to reduce efficiently the influence of transmission errors on a video picture which must be regenerated from series of data words of variable length.

In accordance with the invention a group of a predetermined fixed number of successive transmission bit blocks is subjected at the transmitter station to a formatting operation so as to compose a channel bit block comprising a predetermined fixed number of bit positions, which channel bit block is divided into a number of sub-channel bit blocks of equal length, which number is equal to the number of transmission bit blocks in the group. Each transmission bit block is divided into a main block and an auxiliary block. The main block at least comprises those code words (first code words) which are considered to be the most important ones and these main blocks are accommodated at the first bit positions of the respective sub-channel bit blocks. The bits of the auxiliary blocks are spread over the remaining, free bit positions which are left in the different sub-channel bit blocks after accommodating the main blocks.

In the case of loss of synchronization at the receiver station due to bit errors which have occurred during the transmission, data words of a main block can be regained faultlessly so that, for example, in transform coding at least the dc coefficient can be regenerated for each sub-picture. The result is that at least the average luminance and/or color of each sub-picture can be displayed faultlessly. Moreover, if the main block comprises the data words of a number of selected non-zero ac coefficients, each sub-picture can also be displayed with a limited definition. If for the selected non-zero ac coefficients those coefficients having the largest value are taken, perturbations of the other non-zero ac coefficients appear to cause a hardly noticeable degradation of the video picture.

In this way the effect of transmission errors is not only reduced to a great extent, but the transmission efficiency is considerably improved. In fact, no or much fewer additional bits which are exclusively intended for synchronization purposes are to be transmitted.

It is to be noted that the data words which correspond to the dc coefficients may have a predetermined fixed length and, if desired, may comprise error correcting bits. The same may apply to the data words which correspond to a number of the selected non-zero ac coefficients.

To be able to regain the original video picture at the receiver station, it is adapted according to the invention to perform a deformatting operation on the received channel bit block which is inverse to said formatting operation so that this channel bit block is converted into the original transmission bit blocks.

REFERENCES

1. An experimental digital VCR with 40 mm Drum, Single Actuator and DCT-Based Bit-Rate Reduction. S. M. C. Borgers, W. A. L. Heijnemans, E. de Niet, P. H. N. de With; IEEE Transactions on Consumer Electronics, Vol. 34, No. 3, August 1988; pp. 697-705.
2. Verfahren zur digitalen Nachrichtenübertragung. H. W. Keesen, G. Oberjatzas, H. Peters; European patent application no. 0,197,527 (correspond to U.S. Pat. No. 4,694,336).
3. Television Transmission System with Differential Encoding of Transform Coefficients. P. H. N. de With; European patent application no. 0,341,780 (corresponding to U.S. Pat. No. 4,953,020).
4. One-dimensional linear picture transformer. R. Woudsma, D. C. H. Chong, B. T. McSweeny, S. M. Borgers, E. A. P. Habraken; European patent application no. 0,286,184 (corresponding to U.S. Pat. No. 4,881,192).
Adaptive Coding of Monochrome and Color Images. W. H. Chen, C. H. Smith; IEEE Transactions on Communications, Vol. COM-25, No. 11, November 1977, pp. 1285-1292.
Verfahren und Schaltungsanordnung zur Bitratenreduktion. P. Vogel; European patent application no. 0,260,748 (corresponding to U.S. Pat. No. 4,901,075).
7. Efficient coding of side information in a low bit rate hybrid image coder. H. Schiller, B. B. Chandhuri; Signal Processing Vol. 19, No. 1, January 1990.
8. High efficiency coding apparatus. T. Kondo; European patent application no. 0,225,181 (corresponding to U.S. Pat. No. 4,722,003).

EXPLANATION OF THE INVENTION

Brief description of the Figures

FIGS. 3, 4, 5, 6A, 6B, 6C, 6D, 6E, 7A, 7B, 7C, 7D, 8 and 9 show diagrams to explain the operation of the coding station of FIG. 2.

GENERAL STRUCTURE OF A TELEVISION SYSTEM

The invention will be described with reference to a video recorder which receives the previously mentioned three picture signals PS(1), PS(2) and PS(3) from a picture signal source. In view of the fact that all of these three signals should be subjected to the same operations, only one of the three picture signals will be considered in this description, viz. the picture signal PS(1) which represents, for example, the luminance signal Y.

Figure 1:
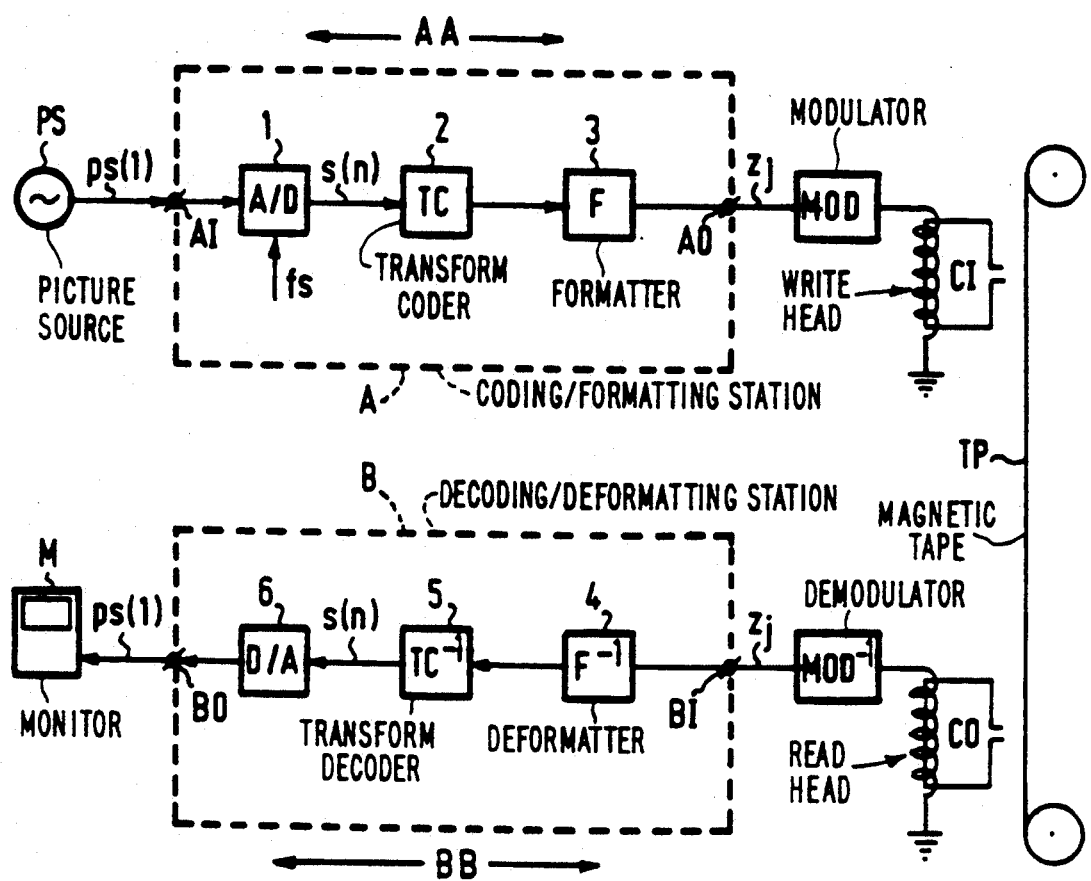
FIG. 1 shows diagrammatically a transmitter and receiver station according to the invention which jointly constitute a video recorder.

The video recorder diagrammatically shown in FIG. 1 comprises a transmitter station AA and a receiver station BB. The transmitter station AA has a coding-/formatting station A with an input AI for receiving the analog picture signal PS(1) which is supplied by the picture signal source PS, for example a video camera. The output AO of this station A supplies a serial channel bit stream $z_j$ which is applied via a modulation circuit MOD to a write head CI by means of which this channel bit stream can be recorded on a magnetic tape TP. To regain the original picture signal, a read head CO is present in the receiver station BB, the read head converting the information on the magnetic tape TP into an electric signal which, after demodulation in a demodulation circuit $MOD^{-1}$, yields the channel bit stream $z_j$ again which is applied to the input BI of a decoding/deformatting station B. The output BO of this station supplies an analog picture signal PS(1) which is applied to a monitor M.

In the station A the analog picture signal PS(1) is sampled in an A/D converter 1 at a suitable sampling frequency $f_s$ of, for example 13.5 MHz and the picture signal samples obtained are coded into, for example 8-bit PCM words s(n). These picture signal samples are subsequently subjected to a coding operation and for this purpose they are applied to a transform coding circuit 2. In the first place, this circuit is adapted to perform a forward two-dimensional transform, for example a Discrete Cosine Transform (DCT). Generally, a television picture is partitioned into sub-pictures of E by E pixels each and the associated picture signal samples of each sub-picture are transformed into a block of E by E coefficients. The coefficients of such a block will be denoted by $y_{i,k}$ in which i;k=0, 1, 2, ... E-1. The coefficient $y_{0,0}$ represents the dc coefficient and is a measure of the average luminance of the sub-picture. The other coefficients $y_{i,k}$ with i,k≠0 are the ac coefficients. A typical value of E is eight.

In the second place, such a coefficient block of $E^2$ (=64) coefficients is subjected to a coding operation and thus converted into a transmission bit block comprising a series of bit-serial data words. The number of data words in a series may be different from coefficient block to coefficient block. Since the coding operation comprises inter alia a variable length coding, the number of bits per data word will also be different for different data words.

Before transmitting the series of transmission bit blocks thus obtained, it is subjected to a formatting operation in a formatting circuit 3 which supplies the serial channel bit stream $z_j$.

In the station B the serial channel bit stream $z_j$ supplied by the demodulator circuit $MOD^{-1}$ is applied to a deformatting circuit 4 which again supplies the series of transmission bit blocks and supplies them to a transform decoding circuit 5. On the one hand, this circuit is adapted to perform a decoding operation which is inverse to said coding operation so that received data words are converted into a coefficient block $y_{i,k}$. On the other hand, this transform decoding circuit 5 is adapted to perform an inverse two-dimensional transform so that coefficient block $y_{i,k}$ is converted into the series of picture signal samples s(n). This series is converted by a D/A converter 6 into the original analog picture signal PS(1) which can be displayed on the monitor M.

The coding/formatting station

Figure 2:
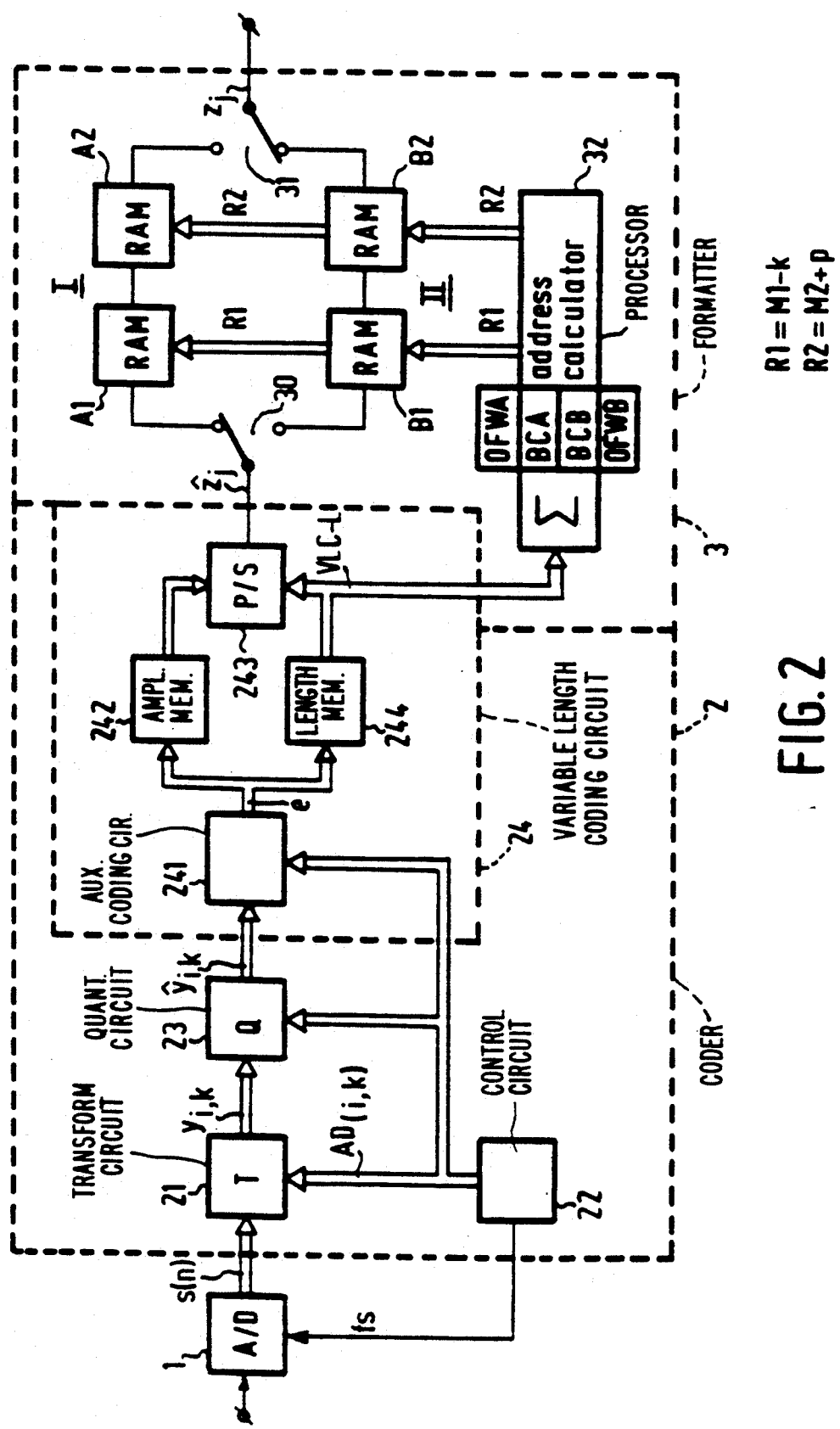
FIG. 2 shows in greater detail a coding station for use in the transmitter station of FIG. 1.
Figures 3, 4, 5:
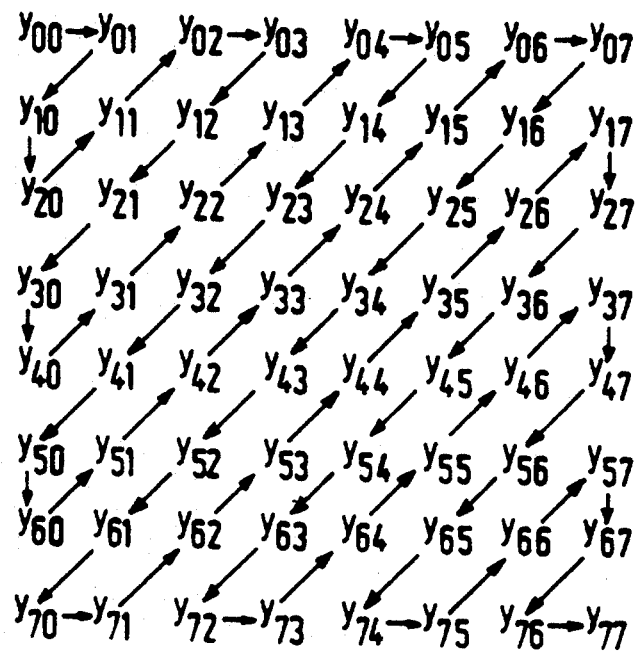

A more detailed embodiment of the coding/formatting station H is shown in FIG. 2. In addition to the A/D converter 1 it comprises a transform circuit 21 which is adapted to subject sub-pictures of 8×8 pixels to a two-dimensional transform, for example, a discrete cosine transform. There are numerous descriptions in literature of embodiments of such a transform circuit, see for example Reference 4, so that in this context it will be sufficient to remark that this transform circuit supplies the coefficient block $y_{i,k}$ shown in FIG. 3 for each sub-picture of 8×8 pixels. These coefficients are successively applied to its output, with the dc coefficient $y_{0,0}$ in the lead. The sequence is denoted by means of arrows in FIG. 3 and is determined by a control circuit 22 which generates address words AD(i,k) for this purpose and applies them to the transform circuit 21. The series of coefficients thus obtained (shown in FIG. 4) is further applied to a quantization circuit 23. This circuit subjects the received coefficients $y_{i,k}$ to some quantization operations so that the quantized coefficients $y_{i,k}$ shown in FIG. 5 are obtained, all of which have the same word length. In this embodiment it has been assumed that the quantization is dependent on the location of the coefficient in the coefficient block. To this end, the quantization circuit 23 not only receives the coefficients but also the associated address words AD(i,k). Since many ac coefficients are small, many quantized coefficients $y_{i,k}$ will have the value of zero. In this connection it is common practice to refer to them as zero coefficients and non-zero coefficients.

In the embodiment shown, the coefficients $y_{i,k}$ are subsequently applied to a variable length coding (VLC) circuit 24 which subjects each coefficient block of 64 quantized coefficients $y_{i,k}$ to some variable length coding strategy and converts them into a series of data words in a bit-serial format, hereinafter referred to as transmission bit block, so that the transmission bit series $z_j$ is obtained at the output of this VLC circuit 24.

Different variable length coding strategies are applicable in this case. For example, the strategy (further referred to as VLC strategy) in which a data word is defined for each possible value which a coefficient $y_{i,k}$ may assume. The number of bits in this data word is dependent on the probability of a coefficient of this value occurring. Another strategy (further referred to as VLC-RL strategy) is that its non-zero coefficients are subjected to the above-mentioned VLC strategy and that series of successive zero coefficients are subjected to the well-known run length coding. As is known, a length-variable data word is defined for each length which a run may assume, which data word indicates the number of zero coefficients of the run and which has a number of bits which is dependent on the probability of a run of this length occurring. However, the strategy (further referred to as PKI strategy) described in Reference 6 and implemented in FIG. 2 is recommended more and more frequently. In this strategy the series of coefficients shown in FIG. 5 is divided into events in an auxiliary coding circuit 241. An event may comprise the dc coefficient or a non-zero ac coefficient together with the series of immediately succeeding or preceding zero coefficients. The number of zero coefficients in such a series may have the value of zero. The auxiliary coding circuit 241 supplies for each event an event word e which unambiguously characterizes an event, i.e. the amplitude of the coefficient and the number of immediately preceding or succeeding zero coefficients. For each possible event word e a data word unambiguously characterizing the relevant event and whose number of significant bits is dependent on the probability of the relevant event occurring is stored in a VLC amplitude memory 242. These data words are read from this memory 242 as soon as the relevant event word e is applied to it as an address.

It is to be noted that it may be advantageous not to subject certain coefficients such as, for example, the dc coefficients to a variable length coding but to a fixed length coding. To distinguish these coefficients from the others, the auxiliary coding circuit also receives the address words AD(i,k) in this embodiment.

It will be evident from the foregoing that in the VLC-RL strategy and the PKI strategy, the number of data words generated for each sub-picture will be considerably smaller than the number of coefficients obtained by transforming this sub-picture.

To be able to distinguish the one transmission bit block from the other, a block separation parameter is generated in some way or other for each sub-picture, with the aid of which parameter it can be ascertained at the receiver station which code words jointly form one transmission bit block. This block separation parameter may indicate, for example, the number of code words or the number of bits comprised in the transmission bit block, but it may alternatively be the last code word of a transmission bit block, generally known as End of Block and referred to as EOB.

In the embodiment of FIG. 2, it has been assumed that this block separation parameter is formed by an EOB. This is supplied by VLC amplitude memory 242 in response to an event word LEW (Last Event Word) which is supplied by the auxiliary coding circuit 241 as soon as it receives the address word AD(77) from control circuit 22, which address word indicates the last coefficient of the coefficient block and which indicates that no event words are to be expected for the relevant coefficient block.

In the embodiment shown, it has been assumed that the data words at the output of the VLC amplitude memory 242 occur in a bit-parallel format. However, for transmission they should be converted into a bit-serial format and therefore they are applied to a parallel-series converter 243. This converter also receives a VLC length word (VLC-L) for each data word which is supplied by VLC amplitude memory 242, which length word indicates the number of significant bits comprises in the relevant data word. Only these significant bits are applied to the output of the parallel-series converter 243 so that the transmission bit stream $z_j$ is obtained.

The VLC length words VLC-L are supplied by a VLC length memory 244 which is also addressed by the event words e and which comprises a VLC length word for each event word.

The series of bit-serial data words thus obtained, as well as the VLC length words which are supplied by memory 244, are applied to the formatting circuit 3 where they are subjected to a formatting operation. The formatting circuit 3 comprises two parallel formatting channels I and II each having a first and a second work mode which are alternately activated. In the Figure this alternating activation is symbolized by the two switches 30 and 31. Each formatting channel comprises a series circuit of two memories, viz. A1 and A2 and B1 and B2, respectively, all of which may be in the form of, for example a random access memory (RAM). These memories are addressed by a processor 32 which receives the VLC length words VLC-L from memory 244 for this purpose.

This formatting circuit supplies the channel bit stream $z_j$ and each time converts a group of N successive transmission bit blocks (hereinafter referred to as super-transmission bit block) into a channel bit block comprising N sub-channel bit blocks $SCB_n$ with M bit positions each (see FIG. 6A). The operation of the formatting circuit will be explained with reference to FIGS. 6B to 6E. FIG. 6B diagrammatically shows a super-transmission bit block comprising N=5 transmission bit blocks TRB1, ..., TRB5 of different length with, for example 110, 70, 90, 120 and 100 bits, respectively. The formatting circuit now accommodates these five transmission bit blocks in the five sub-channel bit blocks. To this end, each transmission bit block $TRB_n$ is first divided into a main block $H_n$ and an auxiliary block $S_n$, as is also shown in FIG. 6B. Different divisions are possible, but without being complete, three examples will be described in greater detail. In a first example, the main block comprises all bits of a fixed number of selected code words. If these code words are length-variable, this means that the main block will also be variable in length. The selected code words will be at least those which are considered to be important. In a second example, the main block comprises the first Q bits of the transmission bit block, but if it comprises fewer bits than these Q bits, it comprises all bits of the transmission bit block. In a third example, the main block comprises a variable number of complete code words, which number is chosen to be such that a number of bits which is approximately equal to a predetermined number corresponds thereto. As a further criterion this number of bits should be at least equal to this predetermined number. Another criterion is of course that this number of bits is at most equal to this predetermined number or is within a predetermined range. For example, let it be assumed that a transmission bit block comprises 110 bits spread over nine code words of 12 12 10 9 15 14 18 13 7 bits, respectively, with the first three code words being the most important. Let it be assumed that a main block must comprise at least 50 bits, the main block will comprise the first five code words and hence 58 bits in this case. However, if in a further criterion the main block should comprise substantially but not more than 50 bits, the main block would comprise the first four code words and hence 43 bits.

In accordance with the second example, it will hereinafter be assumed that a main block comprises the first Q bits of the transmission bit block. In a practical embodiment, M is chosen to be 100 and Q is chosen to be 80.

Successive main bit blocks are now accommodated in successive sub-channel bit blocks as is shown in FIG. 6C. The shaded areas represent the bit positions which are still free. The remaining auxiliary blocks $S_n$ can now be further considered to be an auxiliary series (see FIG. 6D) and their successive bits are subsequently accommodated at the successive bit positions which are still free. This results in the channel bit block shown in FIG. 6E. As may be apparent therefrom, the first 20 of the thirty bits of S1 are accommodated at the twenty bit positions which are still free and which immediately succeed H1. The first ten of the thirty free bit positions between H2 and H3 are occupied by the ten remaining bits of S1, the next ten by the ten bits of auxiliary block S3, the subsequent ten by the first ten bits of S4, and so forth.

It is to be noted that N=5 has been chosen as an example in this case. The number of transmission bit blocks in a super-transmission bit block may, however, also be chosen to be equal to the number of sub-pictures in a complete picture, viz. 6480. In practice, however, a number of 30 appears to be more attractive. The use of channel blocks has the advantage that, if an incorrigible transmission error still occurs, its influence is limited to 30 sub-pictures only.

In the embodiment shown in FIG. 2, the 30 transmission bit blocks of a super-transmission bit block are written bit by bit into, for example, the memory A1.

After reading these thirty transmission bit blocks, memory A1 will have the contents shown, for example, in FIG. 7A. In this Figure, SP denotes free memory locations. While the successive transmission bit blocks are written bit by bit into the memory A1, processor 32 receives the associated VLC length word for each code word. These length words are accumulated for each transmission bit block so that a number is obtained which indicates how many bits are comprised in a transmission bit block. This number is referred to as "bitcost". The bitcost for the bit block $TRB_n$ will be denoted by $BC_n$. In FIG. 7B the associated bitcost is shown for a number of the transmission bit blocks written into memory A1. These bitcosts are stored in memory locations of a memory BCA which forms part of processor 32. For the transmission bit blocks written into memory B1, the corresponding bitcosts are stored in the memory locations of a memory BCB which also forms part of processor 32.

In this embodiment processor 32 has a second set of memories OFWA and OFWB. In each memory location thereof a number $OFW_n$ is stored which indicates the difference between the bitcost $BC_n$ and the previously mentioned fixed number Q for a transmission bit block $TRB_n$. This difference will be referred to as "overflow". For some transmission bit blocks, the relevant overflow is also shown in FIG. 7B.

After all bits of thirty successive transmission bit blocks are thus written into memory A1, the associated bitcosts are written into memory BCA and the overflows are written into memory OFWA, the bits of the thirty subsequent transmission bit blocks are written one by one into memory B1, the associated bitcosts are written into memory BCB and the overflows are written into memory OFWB. Simultaneously, bits in memory A1 are copied to memory A2. For better understanding it is assumed that the memory A2 comprises 30 memory rows of M bits each. This is shown in FIG. 7C in which the successive memory rows are denoted by $gr_1$ to $gr_{30}$. This copying process is realized by processor 32. More particularly, the first Q bits (if present) of each transmission bit block $TRB_n$ are first copied to memory row $gr_n$. However, if $TRB_n$ comprises fewer than these Q bits, only these are copied to memory row $gr_n$. Subsequently the remaining bits are copied to the free memory locations in the different memory rows. For the embodiment shown in FIG. 7, this copying process has the result that in a first process phase of transmission bit block $TRB_1$, the first 80 bits are copied to memory row $gr_1$, the 70 bits of $TRB_2$ are copied to memory row $gr_2$, and so forth. After completion of this first process phase, memory row $gr_1$ still has 20 free memory locations, memory row $gr_2$ has 30, and so forth. FIG. 7C shows the degree of filling of the different memory rows at the end of this first process phase by means of a broken line. In a second process phase the 30 bits to be copied of transmission bit block $TRB_1$ are spread over the memory rows $gr_1$ and $gr_2$. The first 20 bits of the remaining 30 bits of transmission bit block $TRB_1$ are copied to the 20 free memory locations in memory row $gr_1$, the other 10 bits are copied to the first 10 of the 30 free memory locations in memory row $gr_2$, and so forth. If all bits in memory A1 (FIG. 7A) are copied to memory A2 (FIG. 7C) in this way, the memory rows of memory A2 are read consecutively. First the M=100 bits of memory row $gr_1$ are read consecutively, then the M=100 bits of memory row $gr_2$, and so forth.

Figure 8:
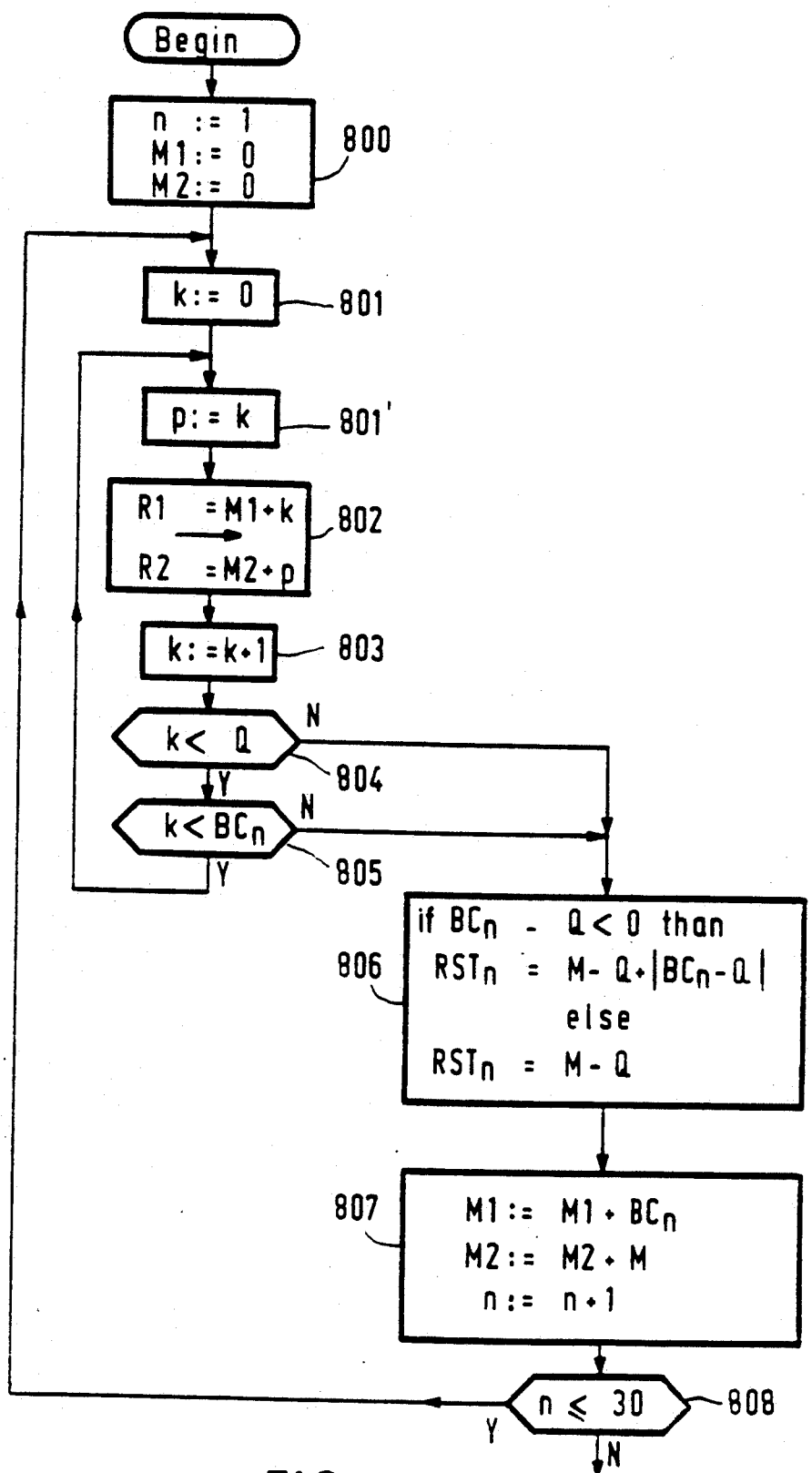
Figure 9:
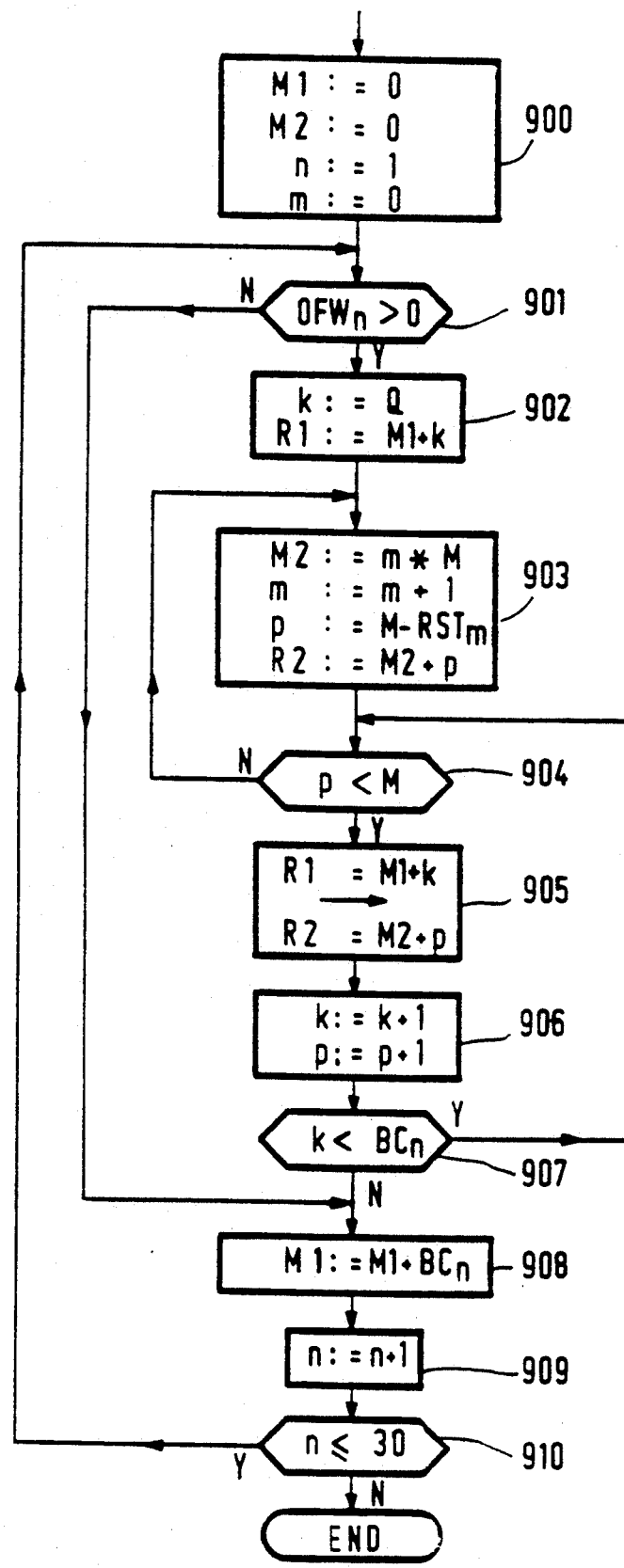

This copying process is shown as a flowchart in FIGS. 8 and 9. More particularly FIG. 8 shows said first process phase and FIG. 9 shows the second process phase of this copying process. It has been assumed that the address R1 and R2 of a memory location in memory A1, B1 and A2, B2 is determined by the mathematical sum of a main address M1, M2 and a first auxiliary address k and a second auxiliary address p, respectively.

As is shown in FIG. 8, the first process phase of the copying process starts with an initiation step 800. In this step an internal counter of processor 32, whose count n represents the ordinal number of a transmission bit block $TRB_n$ $TRB_n$, is reset to one. This counter will hereinafter be referred to as transmission block counter. The main addresses M1 and M2 are also reset to zero and in step 801, the auxiliary address k is reset to zero and in a step 801', the auxiliary address p is made equal to k. In other words, processor 32 now addresses the first memory location of memory A1 as well as of memory A2. In step 802, the bit in memory location R1=M1+k of memory A1 is subsequently copied to memory location R2=M2+k of memory A2. In step 803 the auxiliary address k is subsequently raised by one, in step 804, it is subsequently checked whether this auxiliary address has reached the value Q (=80). If not, it is checked in step 805 whether this auxiliary address may have reached a value which is equal to the number of bits in the transmission bit block $TRB_n$, (i.e. the bitcost $BC_n$ of $TRB_n$). If this is not the case either, there are still bits of transmission bit block $TRB_n$ which can be copied to memory row $gr_n$ and the steps 801', 802-805 are therefore performed again.

If it should appear in step 805 that all bits of transmission bit block $TRB_n$ are copied to memory row $gr_1$, or if it should appear in step 804 that the first Q bits of transmission bit block $TRB_n$ are copied to memory row $gr_n$, it is computed in a step 806 how many free memory locations are still available in memory row $gr_n$. This number will be referred to as rest locations and will be denoted by $RST_n$. For its computation use is made of the previously computed overflow data (see FIG. 7B). This number of rest locations for each memory row $gr_n$ is shown in FIG. 7D and these data are stored in a further internal memory of processor 32. In a step 807 the main address M1 is subsequently set to a value which corresponds to the first bit of the next transmission bit block $TRB_{n+1}$ and the main address M2 is set to a value which corresponds to the first bit of the next memory row $gr_{n+1}$. Subsequently, the count n of transmission block counter is raised by one. If it appears in step 808 that not all thirty transmission bit blocks have been processed in the manner described above, the steps 801-808 are performed again. When, by means of this first process phase, the first Q (=80) or, where appropriate, all $BC_n$ bits of the corresponding transmission bit blocks $TRB_n$ are copied in each one of the memory rows $gr_n$, the second process phase is performed. This is shown in FIG. 9 and comprises an initiation step 900 in which the two main addresses M1 and M2 are reset to zero. The count n of the transmission block counter is reset to one and a further internal counter of processor 32, whose count m represents the ordinal number of a memory row, is reset to zero. This counter will hereinafter be referred to as memory row counter.

In step 901, it is subsequently checked whether the overflow of the actual transmission bit block $TRB_n$ is positive, i.e. whether it comprises more than Q (=80) bits. If this is the case, the auxiliary address k is set to the value Q ($=80$) in step 902 so that the address R1 for memory A1 becomes equal to Q. In a step 903, the address R2=M2+p is now determined. To this end the main address M2 is set to a value m*M, which in the first instance is equal to zero. Subsequently the count of the memory row counter is raised by one and the second auxiliary address p is set to the value M-RST$_m$. Since this second auxiliary address may not exceed the value M ($=100$), this auxiliary address is compared with M in step 904. If it appears that p has indeed become larger than M, step 903 is performed once again so that the main address M2 is set to the start of the next memory row gr$_{m+1}$ and the address R2 is set to the first free memory location in this memory row gr$_{m+1}$.

If the second auxiliary address p has a value which is smaller than M ($=100$), the bit at address R1 (for example, 81) in memory A1 is copied to address R2 (for example, also 81) in memory A2 (step 905). Subsequently, the first auxiliary address k and the second auxiliary address p are raised by one in step 906. If it appears in step 907 that the first auxiliary address k is still smaller than the number of bits in the relevant transmission bit block, bits thereof are still to be copied to memory A2 and therefore the steps 904-907 are performed again. It will then happen (step 904) that a new bit to be copied is copied to the first free memory location of the next memory row. As soon as it is apparent that the relevant transmission bit block no longer comprises any bits which are still to be copied, the main address M1 is set to the start of the next transmission bit block TRB$_{n+1}$ in step 908. Moreover, the count of transmission block counter is raised by one in step 909 and thus adapted to the ordinal number of this subsequent transmission bit block. Finally it is checked in step 910 whether this count does not reach a value (30) which exceeds the number of transmission bit blocks in a super-transmission bit block. If this count indeed still does not exceed 30, the steps 901-910 are performed again. If the count n has exceeded 30, this second process phase has come to an end and a new super-transmission bit block can be copied from the one to the other memory.

It is to be noted that it is checked in step 901 whether transmission bit block TRB$_n$ comprises further bits to be copied in addition to the bits already copied. If this is not the case, because the total number of bits in TRB$_n$ is smaller than the fixed number of Q ($=80$), the main address M1 is set to the start of the next transmission bit block (step 908), and if this block is still present within the super-transmission bit block (steps 909 and 910), its non-copied bits are copied as yet by performing steps 901-907 again.

D(4) The decoding/deformatting station

Figure 10:
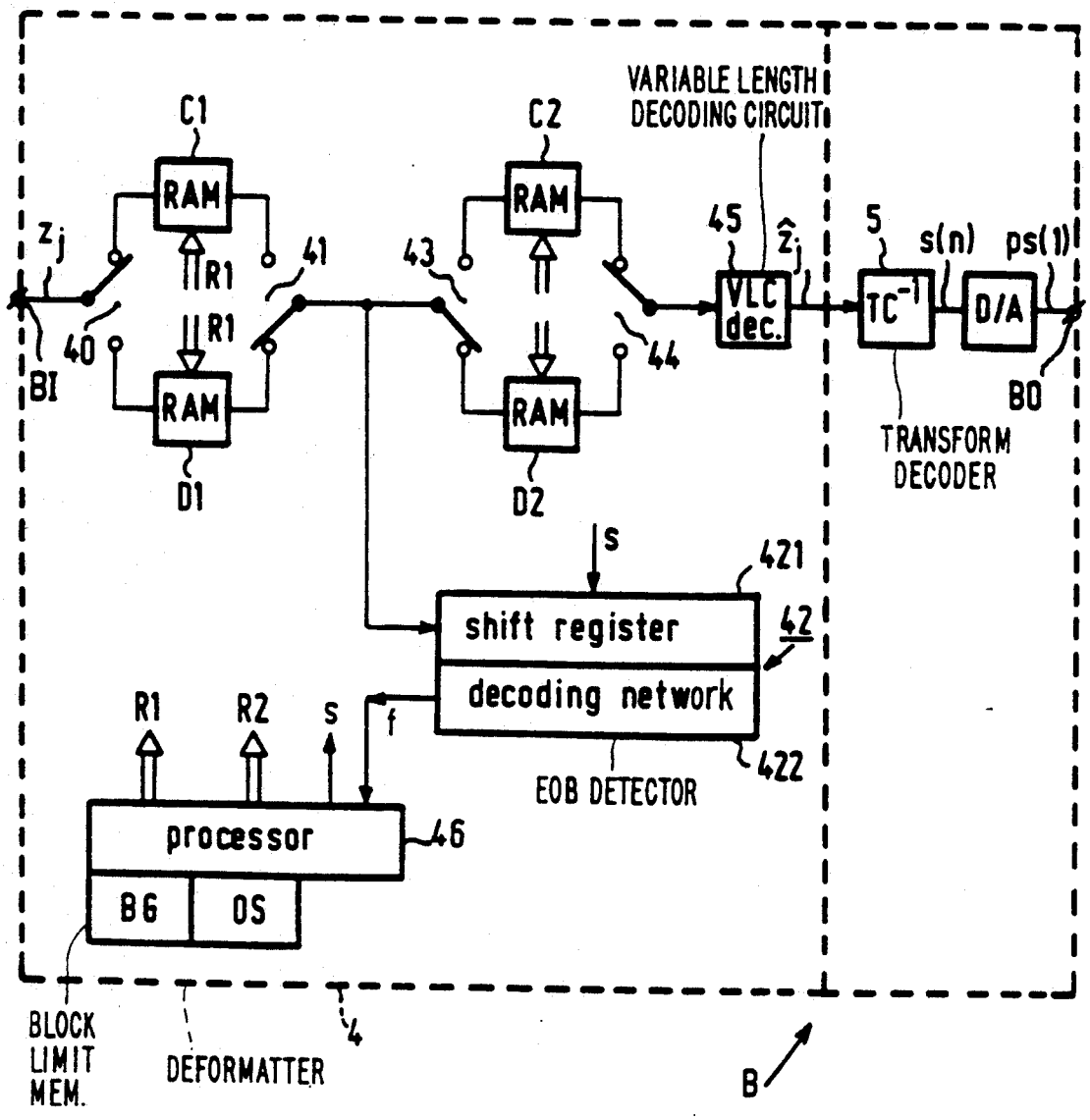
FIG. 10 shows in greater detail a decoding station for use in the receiver station of FIG. 1.
Figure 11A:
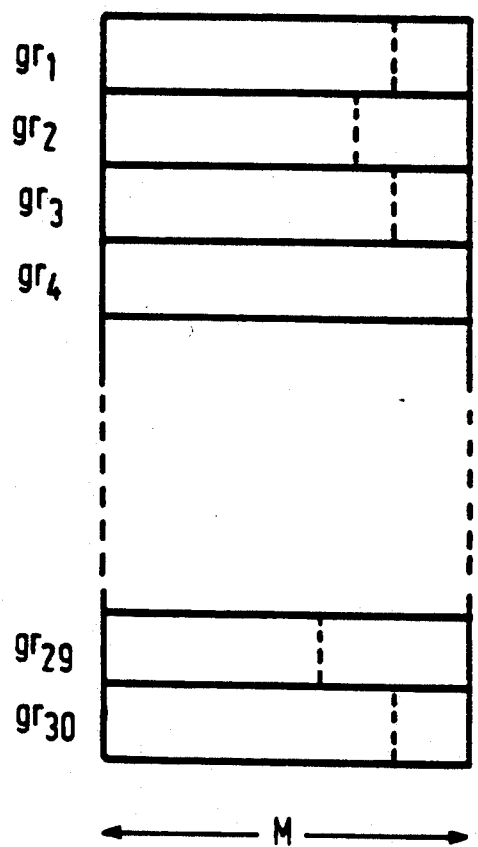
FIGS. 11A, 11B, 11C, 12 and 13 show diagrams to explain the operation of the decoding station of FIG. 10.

A more detailed embodiment of the decoding station adapted to cooperate with the coding/formatting station of FIG. 2 is shown in FIG. 10. It has an input BI which receives the bit steam z$_j$ from the station A and applies it to the deformatting circuit 4. Successive channel blocks in this bit stream are alternately written into a first memory C1 and a second memory D1. If something is written into one of these memories, the contents of the other memory are copied to a memory C2 and D2, respectively. This alternating use of these two memories is symbolized in the Figure by means of the two switches 40 and 41. For the sake of simplicity it will be assumed that each memory C1 and D1 and the memories A2 and B2 in the formatting circuit 3 are divided into thirty rows gr$_1$ ... gr$_{30}$ of M bits each (see FIG. 11A). For addressing memory locations, the memories C1 and C2 or D1 and D2 receive the addresses R1 and R2, respectively. The address R1 is equal to the mathematical sum of a main address MR1 and an auxiliary address k, while address R2 is equal to the mathematical sum of a main address MR2 and an auxiliary address m. The bits read from a memory C1 or D1 are applied to an EOB detector 42 which detects the presence of an EOB code word in the serial bit stream applied to it.

To this end, this EOB detector 42 comprises a shift register 421 which receives a shift pulse S whenever memory C1 or D1 receives a new address R1. A decoding network 422 supplying a logic signal f is coupled to this shift register. This signal has the value "1" whenever the shift register comprises an EOB code word and the value "0" if it does not comprise this EOB code word. The bits stored in the memory C1 or D1 are copied bit block by bit block to the memory C2 or D2, respectively. These memories C2 and D2 receive addresses R2 for this purpose. If bits are copied to the one memory, for example D2, bits are read from the other memory C2. This alternating use of the memories C2 and D2 is symbolized in the Figure by means of the switches 43 and 44. The bits read from a memory C2 or D2 are applied to a variable length decoding circuit 45 which converts each transmission bit block into a series of 64 coefficients each having the same length. This series of coefficients jointly forms the transmission bit stream z$_j$. In the transform decoding circuit 5 the coefficients thus obtained are converted into the series of picture signal samples s(n) which are converted by the D/A converter into the analog picture signal PS(1).

The addresses R1, R2 and the shift pulses S are generated by a control processor 46 which also receives the logic value f from the decoding network 422.

Figure 11B:
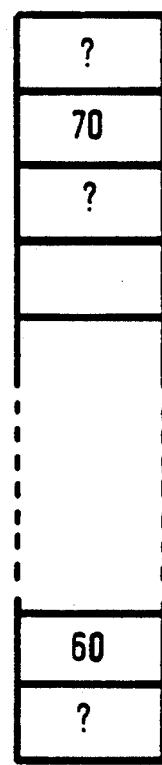

The deformatting circuit 4 converts the series of sub-channel bit blocks SCB$_n$ (see FIG. 6A) into the original series of transmission bit blocks (see FIG. 6B). In a first deformatting phase it is checked in which memory rows gr$_n$ an EOB code word is present within its first Q ($=80$) bits. The location of the last bit of this EOB code word in memory row gr$_n$ is referred to as block limit BG$_n$ and stored in a location of a block limit memory BG which forms part of processor 46. If no EOB code word is found within the Q=80 first bits in a memory row, a "not found flag" (?) is assigned to the relevant block limit BG$_n$. In FIG. 11B the associated block limit (in numbers of bits) has been given for a number of memory rows (sub-channel bit blocks). If block limits are known in this way, all bits associated with one and the same transmission bit block are consecutively copied from memory C1 to memory C2 and from D1 to D2, respectively, in a second deformatting phase. It is to be noted that the memory locations of memories C2 and D2 are addressed in an ascending order.

Figure 12:
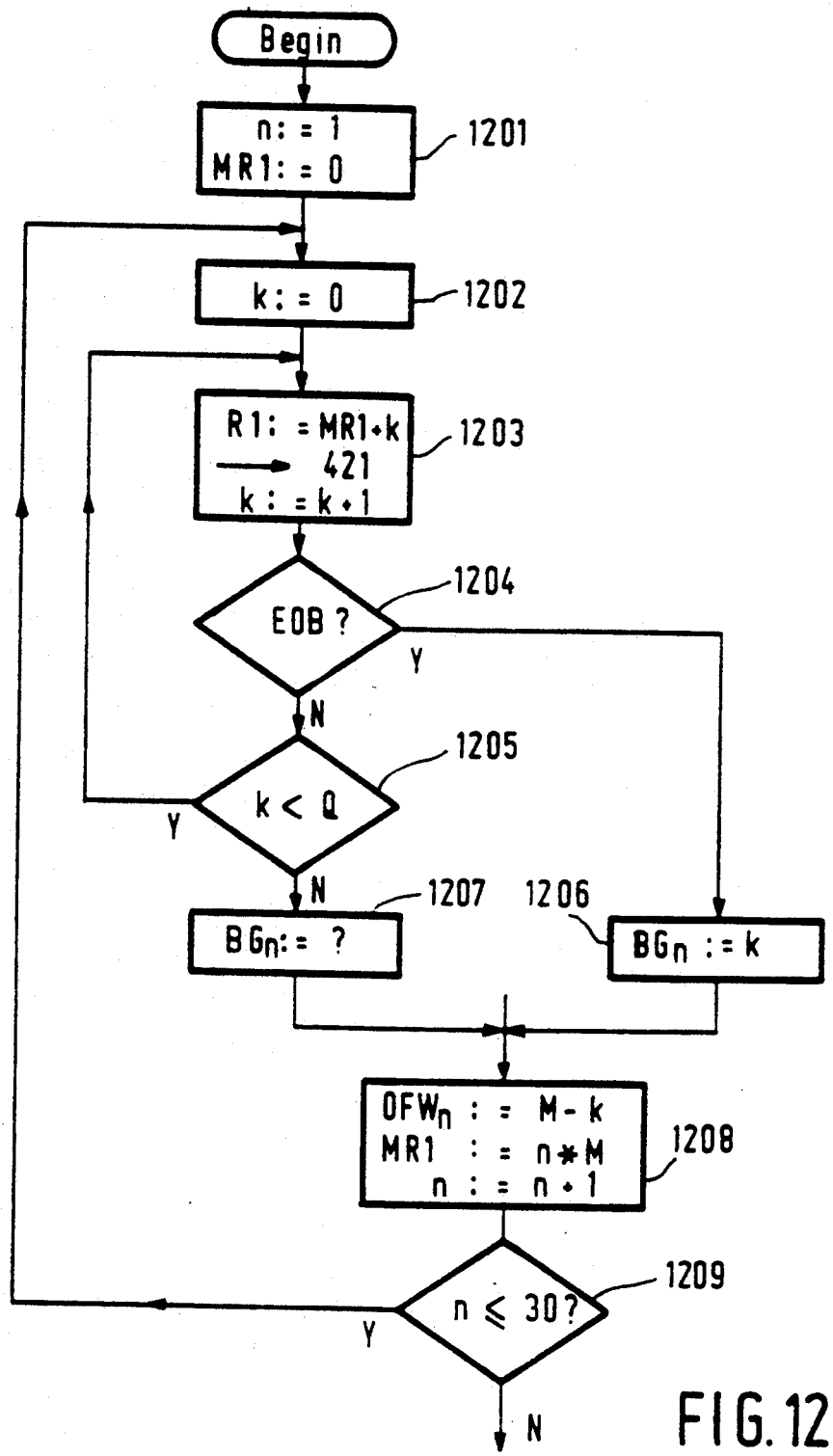
Figure 13:
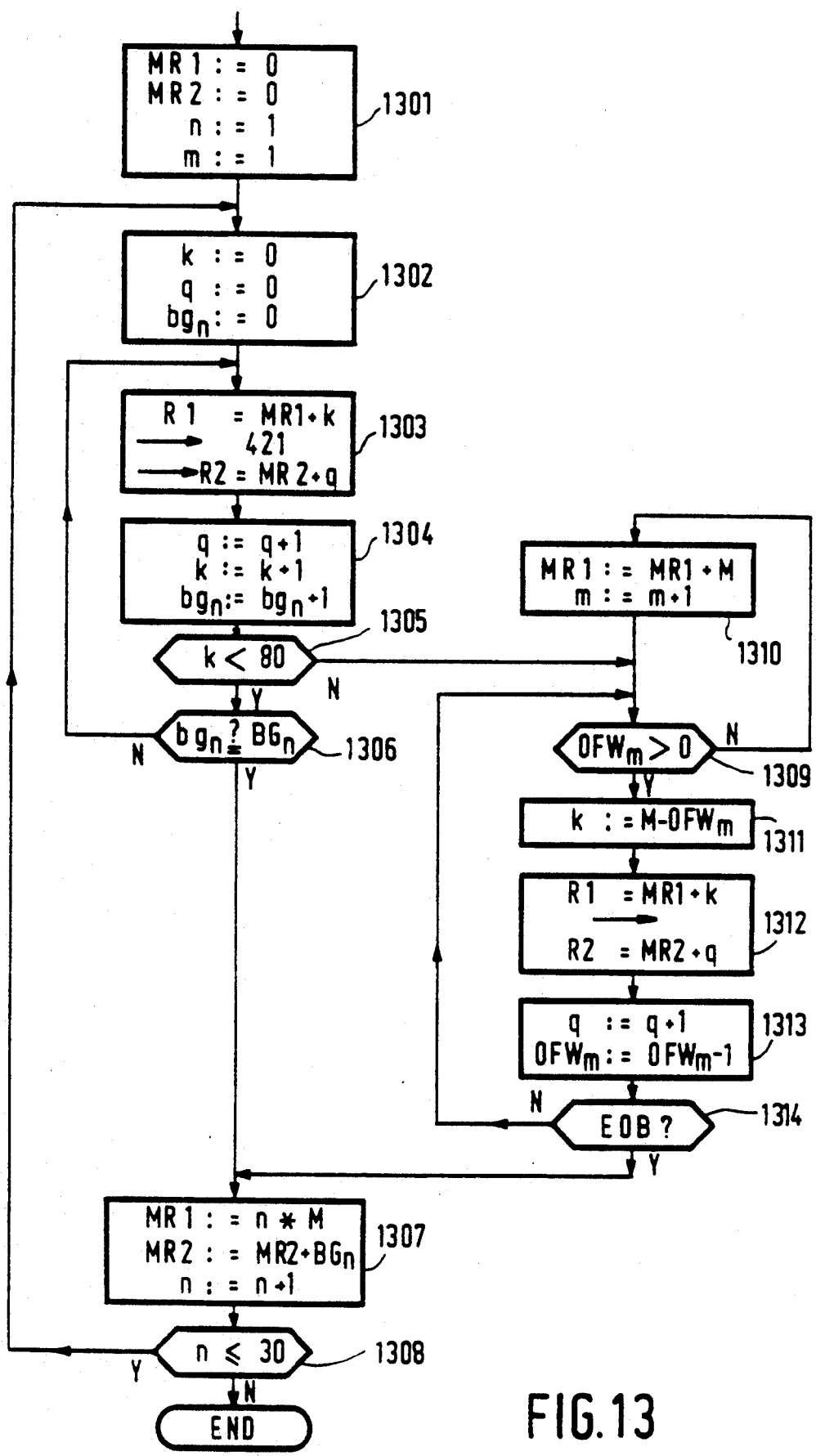

This deformatting process is shown as a flowchart in FIGS. 12 and 13. More particularly, FIG. 12 shows the first deformatting phase and FIG. 13 shows the second deformatting phase.

Figure 11C:
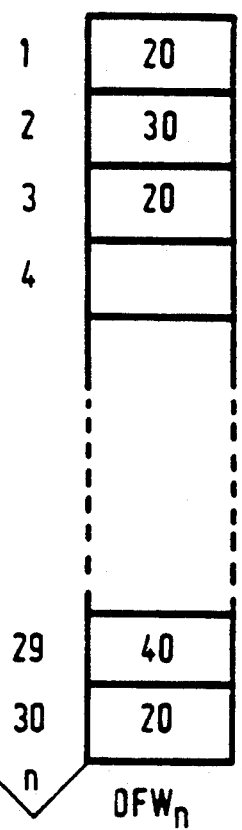

As is shown in FIG. 12, the first deformatting phase starts with an initiation step 1201. In this step an internal counter (referred to as memory row counter) of processor 46 whose count n represents the ordinal number of the memory row gr$_n$ (sub-channel bit block SCB$_n$) is set to one. Moreover, the main address MR1 is set to zero. In step 1202 the auxiliary address k is subsequently set to zero and in step 1203 this auxiliary address k is raised by one after the bit at address R1=MR1+k has been applied to shift register 421. In step 1204 it is further checked whether the shift register comprises the EOB code word. This means that the decoding network 422 supplies a logic "1". If this is not the case, it is checked in step 1205 whether all first Q (=80) bits of the memory row $gr_n$ have been addressed and applied to shift register 421. If this is not yet the case, the steps 1203-1205 are performed again. However, if an EOB code word appears to be present within the first Q bits of the memory row $gr_n$ (step 1204), the actual value of the auxiliary address k is stored as block limit $BG_n$ in block limit memory BG (step 1206). However, if no EOB code word appears to be present within these first Q bits of memory row $gr_n$ (step 1205), the "not found flag" (?) is stored at the memory location $BG_n$ of block limit BG in step 1207. If it has thus been ascertained for a memory row $gr_n$ whether there is an EOB code word within its Q (=80) first bits, and if so, where its last bit is present ($BG_n$), the number of overflow bits $OFW_n$ of this memory row is determined in a step 1208 (see FIG. 11C). This number is equal to the difference between the total number of bits M (=100) in the memory row and the location where the last bit of the EOB code word is present, or if such a code word has not been found, the difference between M (=100) and Q (=80). The locations of this last bit of EOB, as well as Q are represented by the last value of the auxiliary address k. In this step 1208 the memory row counter n is raised by one after the main address MR1 has been raised by M (=100). If not all N=30 memory rows have been processed in this manner (step 1209), the steps 1202-1208 are repeated for the next memory row $gr_{n+1}$.

As soon as the corresponding block limit $BG_n$ is known as a numerical value or as a not found flag (?) for each memory row $gr_n$ by means of this first deformatting phase, the second deformatting phase is performed in which all bits associated with one and the same transmission bit block are copied one by one from memory C1 or D1 to memory C2 or D2, respectively. This second deformatting phase is shown in FIG. 13. It comprises an initiation step 1301 in which the memory row counter is again reset to one (n:=1), an auxiliary address m is reset to one and the two main addresses are set to zero. In a step 1302 auxiliary address k, which will be exclusively used for addressing memory C1 or D1, as well as a further auxiliary address q, which will be exclusively used for addressing memory C2 or D2, respectively, are set to zero and a block limit variable $bg_n$ is also set to zero. Subsequently, the bit at memory location R1=MR1+k is applied to shift register 421 and copied to memory location R2=MR2+q of memory C2 or D2 in step 1303. Subsequently, the auxiliary address k and q as well as the block limit variable $bg_n$ are raised by one in step 1304. If it appears in step 1305 that the auxiliary address k is still smaller than Q (=80) and if, in step 1306, the block limit variable $bg_n$ is still unequal to the real value of the block limit $BG_n$, the steps 1303-1306 are performed again so that the next bit is copied from memory C1 or D1 to memory C2 or D2, respectively. However, if it appears that the block limit has been reached (step 1306), the processor 46 is prepared for copying bits of the next sub-channel bit block. To this end the main address MR1 is first set in a step 1307 to the first memory location of the next memory row, the main address MR2 for memory C2 or D2 is set to the next free memory location MR2+$BG_n$ and finally the memory row counter is raised by one to n+1. If it appears in step 1308 that not all thirty memory rows of memory C21or D1 have been processed, the steps 1302-1308 are repeated for memory row n+1 (and hence for sub-channel bit block $SCB_{n+1}$). However, if all memory rows have been processed, the second deformatting phase has come to an end.

If it is ascertained in step 1305 that all first Q (=80) bits of memory row $gr_n$ have been copied (to shift register 421 as well as to memory C2 or D2) and if no block limit has been reached, this means that bits of the relevant transmission bit block are accommodated in other memory locations, possibly even in other sub-channel bit blocks (memory rows). In order to ascertain in which memory locations of memory C1 or D1 the further bits of this transmission bit block can be found, a search takes place in the sequence m=1, 2, 3 ... for that memory row $gr_m$ which still has copiable bits at one or more of the memory locations in the range $\{(M-1)-OFW_m\}-(M-1)$. This knowledge follows from the fact that the number of overflow bits (indicated by $OFW_m$) is decreased by one whenever an overflow bit has been copied. For this searching action it is therefore checked in step 1309 whether there are still overflow bits in memory row $gr_m$; in other words, whether $OFW_m$ is positive. If this is not the case (no overflow bits available any more) it is checked whether the next memory row $gr_{m+1}$ may still have overflow bits, and so forth (step 1310). As soon as a memory row has been found with overflow bits which are still to be copied ($OFW_m > 0$), the auxiliary address k is set to a value M-$OFW_m$ (=100-$OFW_m$) in step 1311, which corresponds to the address of the first overflow bit still to be copied in memory row $gr_m$. In step 1312 this bit is indeed copied to memory location R2 of C2 or D2. In step 1313 the auxiliary address q is subsequently raised by one, $OFW_m$ is decreased by one, which expresses that the number of overflow bits to be copied in memory row $gr_m$ has been reduced by one. Finally, in step 1314 it is checked whether an EOB code word is instantaneously present in the shift register 421 and if so, the process is continued with step 1307 because all bits associated with a transmission bit block have now been copied from memory C1 or D1 to memory C2 or D2, respectively. If it appears that the shift register does not comprise an EOB code word, the steps 1309-1314 are repeated.

In the embodiment described it has been assumed that the block separation parameter is formed by an EOB code word. As already noted, other block separation parameters are alternatively possible, for example, a parameter indicating how many code words or how many bits are comprised in a transmission bit block. Also when using a different block separation parameter, those skilled in the art will be able to adapt the implementation of the deformatting circuit on the basis of the teachings of the extensively described deformatting circuit and without having to resort to any inventive activity. In fact, all these deformatting circuits have in common that the successive bit series in the channel bit block which jointly form an auxiliary block are displaced to and inserted immediately behind those main blocks whose length is less than that corresponding to the associated block separation parameter. This may also be considered as follows. All those bits which are not associated with a main block are taken from the channel bit block and placed one behind the other (see also FIG. 6D) so that an auxiliary bit series is obtained.

Subsequently, the first main block of this channel bit block is first supplemented with such a number of bits of this auxiliary bit series that this main block has grown to a block whose number of bits or code words corresponds to the block separation parameter. The second main block is supplemented with the remaining auxiliary bit series in a corresponding manner (i.e. the original auxiliary bit series decreased by the bits with which the first main block has been supplemented) and so forth.

In the foregoing, an embodiment has been described in which the processing of only one of the three signals PS(1), PS(2) and PS(3) constituting a color television picture is given in detail because each of these three signals is treated in the same way. In practice, these three signals are sampled separately (usually at distinct sampling frequencies) and digitized. The digital picture signals thus obtained are applied in a time-division multiplex format to the transform circuit 21 which subsequently supplies alternately coefficient blocks associated with these three picture signals in accordance with a predetermined pattern. For example, it first supplies two coefficient blocks associated with PS(1), subsequently one coefficient block associated with PS(2), then again two coefficient blocks associated with PS(1) and finally one coefficient block associated with PS(3), etc. The transmission bit stream $z_j$ is then formed by a series of transmission bit blocks which, in conformity with said pattern, are associated with said three different picture signals. It is noted that in such situation, the sub-channel bit blocks as well as the main blocks may have different lengths for different picture signals.

We claim:

1. A transmitter station for transmitting pictures in a digital form to a receiver station, said transmitter station comprising means for digitizing a series of pictures, and coding means for converting said digitized series of pictures into series of transmission bit blocks of variable length each comprising a number of first code words and a number of second code words, characterized in that the transmitter station further comprises means for formatting, each time, a group of said series of transmission bit blocks (super-transmission bit block) comprising a predetermined number of successive transmission bit blocks so as to compose a channel bit block comprising a predetermined number of bit positions, a plurality of sub-channel bit blocks of predetermined length, and each beginning at a predetermined bit position in the channel bit block, the number of said sub-channel bit blocks being equal to the number of transmission bit blocks in the group, said formatting means dividing each transmission bit block of the group into a main block and an auxiliary block, the main block comprising at least the first code words, the respective main blocks being accommodated at the first bit positions of the respective sub-channel bit blocks and the bits of the auxiliary blocks being spread over the remaining bit positions in the channel bit block; and means for applying said channel bit block to a transmission medium.

2. A transmitter station as claimed in Claim 1, characterized in that each main block comprises all bits of the corresponding transmission bit block up to a predetermined maximum number (Q).

3. A transmitter station as claimed in Claim 1, characterized in that each main block comprises all code words of the corresponding transmission bit block up to a predetermined maximum number.

4. A transmitter station as claimed in Claim 1, characterized in that each main block comprises such a plurality of code words selected from the corresponding transmission bit block that the total number of bits of this main block is within a predetermined range.

5. A transmitter station as claimed in Claim 1, characterized in that said coding means comprises means for partitioning each picture into a series of two-dimensional sub-pictures, means for performing a two-dimensional forward transform on the series of two-dimensional sub-pictures for converting said sub-pictures into coefficient blocks, each coefficient block comprising one dc coefficient means for converting each coefficient block into a transmission bit block.

6. A transmitter station as claimed in Claim 5, characterized in that the transmission bit block comprises a number of first code words corresponding to the dc coefficient and to the largest ac coefficients.

7. A receiver station for receiving a channel bit stream which represents in digital form a series of pictures, said channel bit stream being formed by a succession of channel bit blocks of fixed length, having a predetermined number of bit positions, and a number of sub-channel bit blocks of predetermined length, each such sub-channel bit block beginning at a predetermined bit position in the channel bit block, each channel bit block accommodating a number of transmission bit blocks corresponding to the number of sub-channel bit blocks in the channel bit block, each transmission bit block comprising a block separation parameter which is indicative of the length of the relevant transmission bit block, and is further divided into a main block and an auxiliary block, the respective main blocks being accommodated at the first bit positions of the respective sub-channel bit blocks and the bit of the auxiliary blocks being spread over the remaining bit positions, characterized in that said receiver station comprises means for deformatting each channel bit block into a number of transmission bit blocks, said deformatting means displacing and inserting successive bit series each time forming an auxiliary block immediately behind the respective main block having a length which is less than that signalled by the associated block separation parameter.

8. A device for recording and reproducing video signals in digital form onto and from a record carrier, said device having an input for receiving a series of pictures in the form of digital video signals; coding means for converting said series of pictures into series of transmission bit blocks of variable length each comprising a number of first code words and a number of second code words; writing means for recording said transmission bit blocks on said record carrier; reading means for reading said transmission bit blocks from said record carrier; and decoding means for reforming said series of pictures from said transmission bit blocks for application to a video display device, characterized in that the device further comprises means, coupled between said coding means and said writing means, for formatting, each time, a group of said series of transmission bit blocks (super-transmission bit block) comprising a predetermined number of successive transmission bit blocks so as to compose a channel bit block comprising a predetermined number of bit positions, a plurality of sub-channel bit blocks of predetermined length, and each beginning at a predetermined bit position in the channel bit block, the number of said sub-channel bit blocks being equal to the number of transmission bit blocks in the group, said formatting means dividing each transmission bit block of the group into a main block and an auxiliary block, the main block comprising at least the first code words, the respective main blocks being accommodated at the first bit positions of the respective sub-channel bit blocks and the bits of the auxiliary blocks being spread over the remaining bit positions in the channel bit block, whereby said writing means records said channel bit blocks on said record carrier instead of said transmission bit blocks; and means, coupled between said reading means and said decoding means, for deformatting each channel bit block into a number of transmission bit blocks, said deformatting means displacing and inserting successive bit series each time forming an auxiliary block immediately behind the respective main block having a length which is less than that signalled by the associated block separation parameter.

* * * * *

UNITED STATES PATENT AND TRADEMARK OFFICE
CERTIFICATE OF CORRECTION

PATENT NO. : 5,245,428
DATED : September 14, 1993
INVENTOR(S) : Peter H.N. De With, et al It is certified that error appears in the above-indentified patent and that said Letters Patent is hereby corrected as shown below:

Clsim 5, Column 16, line 13, after "coefficient" insert
-- and a plurality of ac coefficients, and --.

Claim 7, Column 16, line 35, change "bit" (second occurrence) to -- bits --.

Signed and Sealed this

Twenty-second Day of March, 1994

Attest:

BRUCE LEHMAN

Attesting Officer    Commissioner of Patents and Trademarks